United States Patent
Hughes

(10) Patent No.: US 8,128,444 B2
(45) Date of Patent: Mar. 6, 2012

(54) ACTUATOR BOX ASSEMBLY

(75) Inventor: Mark Jeffrey Hughes, Chandler, AZ (US)

(73) Assignee: Apical Industries, Inc., Oceanside, CA (US)

( * ) Notice: Subject to any disclaimer, the term of this patent is extended or adjusted under 35 U.S.C. 154(b) by 930 days.

(21) Appl. No.: 11/595,026

(22) Filed: Nov. 10, 2006

(65) Prior Publication Data

US 2007/0199499 A1    Aug. 30, 2007

Related U.S. Application Data

(60) Provisional application No. 60/776,348, filed on Feb. 24, 2006.

(51) Int. Cl.
*B63C 9/15* (2006.01)
(52) U.S. Cl. .......................................................... 441/90
(58) Field of Classification Search .................. 114/360, 114/68, 69; 441/96, 90–94; 244/107; 74/625
See application file for complete search history.

(56) References Cited

U.S. PATENT DOCUMENTS

| | | | | |
|---|---|---|---|---|
| 2,370,025 | A * | 2/1945 | Edelman | 74/625 |
| 3,041,037 | A * | 6/1962 | Patrick | 251/195 |
| 7,207,522 | B2 * | 4/2007 | Parrott et al. | 244/107 |

* cited by examiner

*Primary Examiner* — Stephen Avila
(74) *Attorney, Agent, or Firm* — Peter K. Hahn; Luce, Forward, Hamilton & Scripps, LLP

(57) ABSTRACT

An emergency floatation system for an aircraft includes an actuator box assembly that activates the floatation system either electrically or manually. The actuator box assembly is separated from a valve assembly of an inflation reservoir and provides an interface between an electromechanical trigger system and a redundant mechanical trigger system. The actuator box includes a pivot member that provides an interface for the redundant trigger systems and an output actuator. For normal operation a button in the cockpit is pressed which sends an electrical signal to an electromechanical actuator in the actuator box assembly. The electromechanical actuator rotates the pivot member, which operates the output actuator and opens the valve assembly. Alternatively, should the electrical system of the aircraft fail, the pilot or other occupant may activate the mechanical trigger system, thereby rotating the pivot member and activating the output actuator to open the valve assembly.

18 Claims, 5 Drawing Sheets

ACTUATOR BOX ASSEMBLY

CROSS-REFERENCE TO RELATED APPLICATIONS

This application is a continuation of U.S. Provisional Patent Application Ser. No. 60/776,348, filed Feb. 24, 2006, which is hereby incorporated in its entirety by reference herein.

FIELD OF THE INVENTION

The present invention relates generally to triggers for emergency equipment used in aircraft. More specifically, the invention relates to redundant triggers for an inflation valve used to inflate emergency floatation devices used on aircraft.

BACKGROUND OF THE INVENTION

Emergency flotation devices are required on many aircraft to provide emergency assistance to passengers and to save the aircraft in the event the aircraft experiences an emergency situation and is forced down in water. Emergency flotation devices generally include systems designed to float the aircraft, systems for emergency life rafts and life vests for individual occupants.

One example of an airplane flotation system is shown in U.S. Pat. No. 1,776,865. The system includes inflatable bags located in a forward portion of an airplane and is manually operated by a pilot. The bags are stored in a non-inflated state within closed compartments. The system utilizes pressure cylinders to sequentially unlock doors of the compartments and inflate the inflatable bags. During operation, the pilot activates the pressure cylinder by pulling a first pull cord attached to a valve, thereby releasing pressurized fluid. After inflation, the pilot is required to second pull a cord that places the pressure cylinder into an intermediate position to block further fluid flow into the bags. The system provides no redundant trigger system.

U.S. Pat. No. 2,264,321 to Manson, describes a life-saving device that includes an inflatable life raft that is arranged in a compartment on the side of a vehicle such as an airplane. The compartment is closed by a pair of hinged doors that are spring-loaded to urge them into an opened position. The doors are held closed by pins that extend through meshing lugs that are included on the doors. A pull cord is secured to the pins and a valve on an inflating-fluid container so that pulling on the cord sequentially removes the pins from the lugs and operates the valve to permit the flow of fluid from the container to the raft. The cord fully disengages from the fluid container after the valve is operated. Similar to the previously described floatation system, this life-saving device provides no redundant trigger system.

In another example of a safety system that may be used for helicopters, described in U.S. Pat. No. 3,340,842 to Winslow, a plurality of balloons fluidly coupled to a pressurized tank of carbon dioxide are employed throughout a vessel. The tank includes an outlet valve fitting that may be operated either by an electrically operated control or a manually operated pull. Both the electrically operated control and the manual pull are coupled directly to the valve fitting on the tank. As a result, replacement of either of the electric control or manual pull would require that the tank be handled, which creates a risk of damaging the tank. In addition, a larger space is required to mount the tank in the vessel because that space must be large enough to accommodate the controls in addition to the tank. Furthermore, because the manual and electric control connect directly to the valve there is no mechanism to assure that one control will not hinder the operation of the other. For example, if the movement of manual control lever was restricted, there is no mechanism that would assure that electric control could be used to release the inflation fluid.

In view of the above, there exists a need for an actuator box assembly for an emergency flotation system that provides the combination of manual and electrical trigger systems all within one assembly that may be mounted separate from the inflation fluid source.

SUMMARY OF THE INVENTION

The floatation system includes an emergency inflatable device, a source of pressurized inflation fluid, redundant trigger systems and an actuator box assembly that provides an interface between the redundant trigger systems. The actuator box assembly consists of a housing assembly, redundant input actuators which form parts of the redundant trigger systems, an output actuator and a pivot member that mechanically couples the actuators. The input actuators and the output actuator are mechanically coupled by the pivot member so that actuation of either input actuator activates the output actuator to deploy the floatation system. The input actuators may include both electromechanical and purely mechanical actuators. For example the actuator box assembly may serve as a way to trigger the discharge of the pressurized inflation fluid electrically as well as manually, if needed. In an embodiment, the electromechanical actuator is a linear actuator that includes an arm that translates when electrically activated and engages a portion of the pivot member. The linear actuator can apply a large amount of force on the pivot member to ensure valve activation and the dimensions of the pivot member may be selected to provide a mechanical advantage when utilizing the manual trigger assembly.

The actuator box assembly is configured so that it may be placed anywhere in the vessel between the trigger controls and the inflation fluid source. The actuator box assembly is primarily designed to provide an interface between the redundant trigger systems and the source of inflation fluid and to initiate inflation of the emergency inflatable by actuating a valve to allow the flow of pressurized fluid from the fluid source to the inflatable. In an embodiment, the primary trigger system is electrically activated. However, if the primary trigger system fails, the system includes a means to manually actuate the valve so that the inflatable may be deployed.

Such a manual backup trigger system may be especially important for situations where there is an electrical failure and the electrical firing of the system is not possible. For example, if a helicopter is forced to land in the water and deploy emergency floats, the pilot can actuate the valve electrically to discharge the inflation fluid to inflate the inflatable by simply pushing a button in the cockpit. However in the event that the electrical system on the helicopter fails, the pilot can also activate the valve to discharge the inflation fluid manually by pulling a pull cable or a lever or by squeezing a mechanical trigger.

These and other features and advantages of the present invention will be appreciated from review of the following detailed description of the invention, along with the accompanying figures in which like reference numerals refer to like parts throughout.

DETAILED DESCRIPTION

Figure 1:
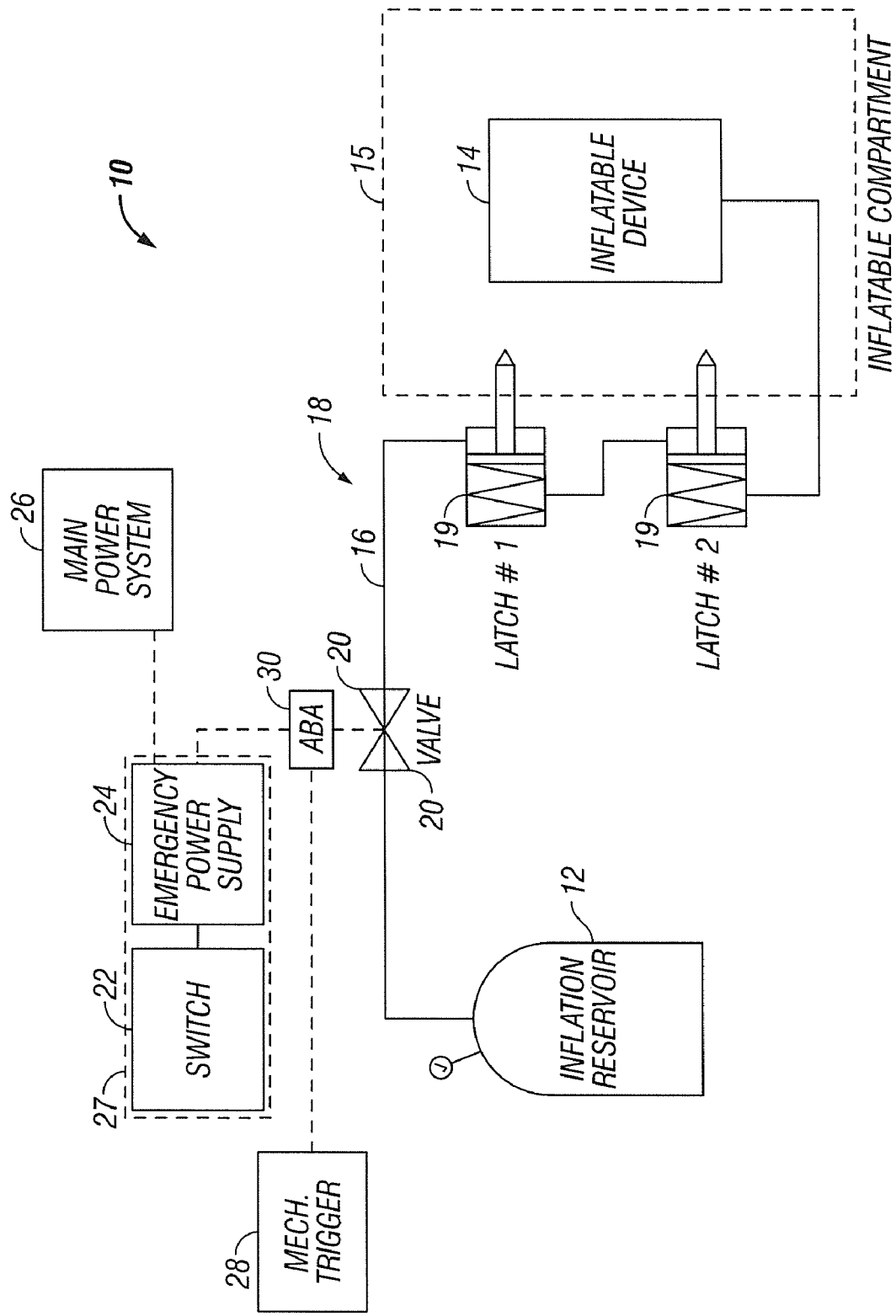
FIG. 1 is schematic of the actuator box assembly in an emergency floatation system.

Referring to FIG. 1, an emergency flotation system 10 in accordance with the present invention will be described. Emergency flotation system 10 generally includes a pressurized fluid source, such as an inflation reservoir 12, that stores a pressurized fluid for selectively inflating an emergency inflatable device 14, such as a life raft. The pressurized fluid may be any fluid capable of inflating an inflatable device, such as air, nitrogen or carbon dioxide. A pressure line 16 fluidly links inflation reservoir 12 with inflatable device 14 through a valve 20 and a latching assembly 18. Valve 20 is normally closed so that fluid communication between inflation reservoir 12 and inflatable device 14 is prevented.

Emergency inflatable device 14 is preferably stored in an emergency compartment 15 and latching assembly 18 includes a plurality of latches 19 that are used to maintain emergency compartment 15 in a locked state. In the present embodiment, latches 19 may be configured so that they are activated and unlocked when valve 20 is opened and fluid is released from inflation reservoir 12. The inflation fluid is free to flow to inflatable device 14 after latches 19 are unlocked. It should be appreciated, however, that any latches known in the art may be employed and it is not necessary that the latches be pressure activated. For example, separate manual or electromechanical latches may be used and pressure line 16 may extend directly from valve 20 to inflatable device 14.

Floatation system 10 includes redundant triggering systems for activating the system and deploying inflatable device 14. In the present embodiment, an electromechanical (EM) triggering system 27 is provided that may draw power from either a main power system 26 or an emergency power supply 24 included in the vessel. A purely mechanical backup triggering system 28 is also provided for redundancy. As will be described in greater detail below, the redundant triggering systems interface at an actuator box assembly 30 so that operation of either will trigger deployment of the floatation system 10 and so that operation of one trigger system is not hindered by the other.

EM triggering system 27 includes a switch 22, a communication line 23 and an electromechanical input actuator 34 that is located within actuator box assembly 30. Switch 22, which may alternatively be a button or knob, preferably is located in the cockpit of the vessel. Switch 22 is configured so that toggling, pushing or turning it results in an electrical signal being sent through communication line 23 to EM input actuator 34. The electrical signal may be any signal capable of activating EM input actuator 34, such as a DC current.

Mechanical triggering system 28 includes a handle (not shown) that is coupled to a purely mechanical input actuator 32, such as a pull cord or mechanical linkage or a combination thereof. Mechanical triggering system 28 is provided so that if EM triggering system 27 is inoperative (e.g., due to a power failure), floatation system 10 may still be deployed. It should be appreciated that the handle of mechanical triggering system 28 may be replaced by a lever or squeeze trigger if desired.

Actuator box assembly 30 provides an interface between EM triggering system 27 and mechanical triggering system 28 so that either may be used to deploy floatation system 10. In particular, actuator box assembly 30 provides a mechanical coupling between EM input actuator 34 and mechanical input actuator 32. It is desired to provide such an interface so that both trigger systems are not required to extend the full distance between the trigger device (i.e., switch 22 or the handle) and valve 20 of inflation reservoir 12. Actuator box assembly 30 also allows the associated EM and mechanical actuators 34, 32 to be mounted anywhere on the vessel separate from inflation reservoir 12.

Figure 2:
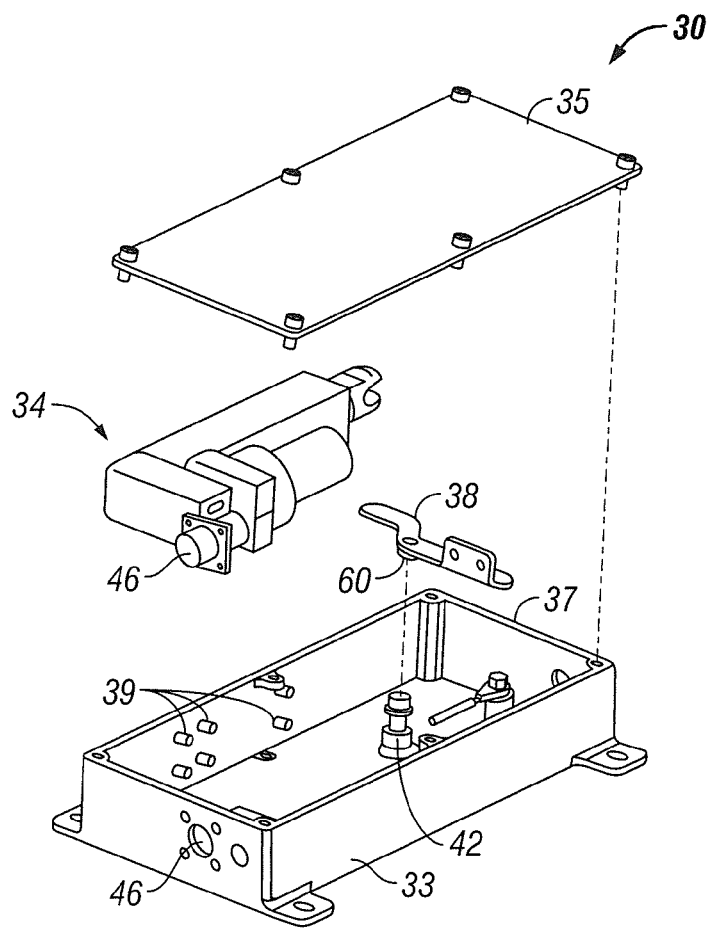
FIG. 2 is an isometric partial exploded view of the actuator box assembly.
Figure 4:
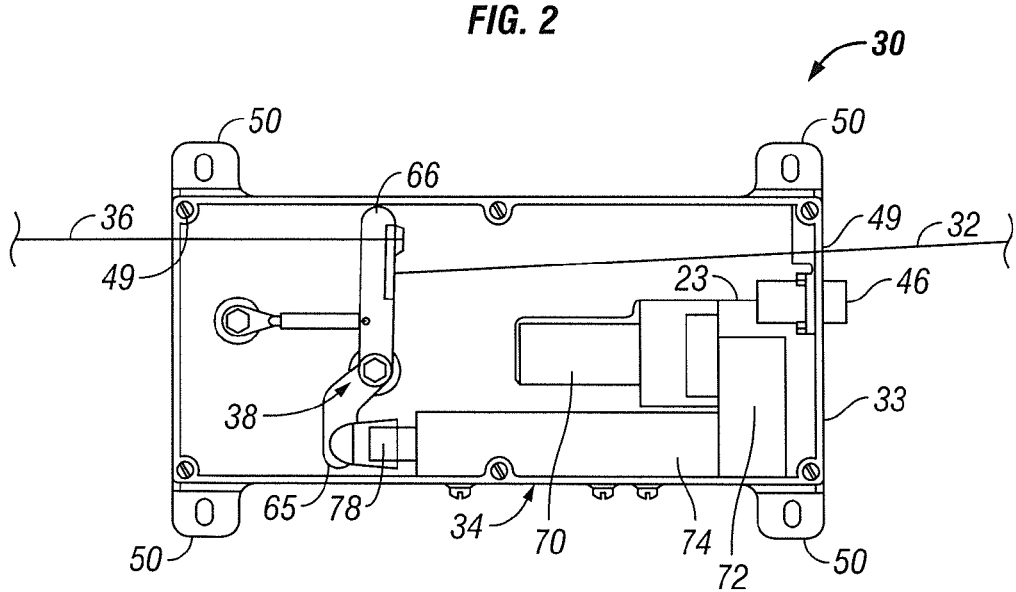
FIG. 4 is a top view of the assembled actuator box assembly with the lid removed to show the contents as they are assembled in a non-deployed state.
Figure 3:
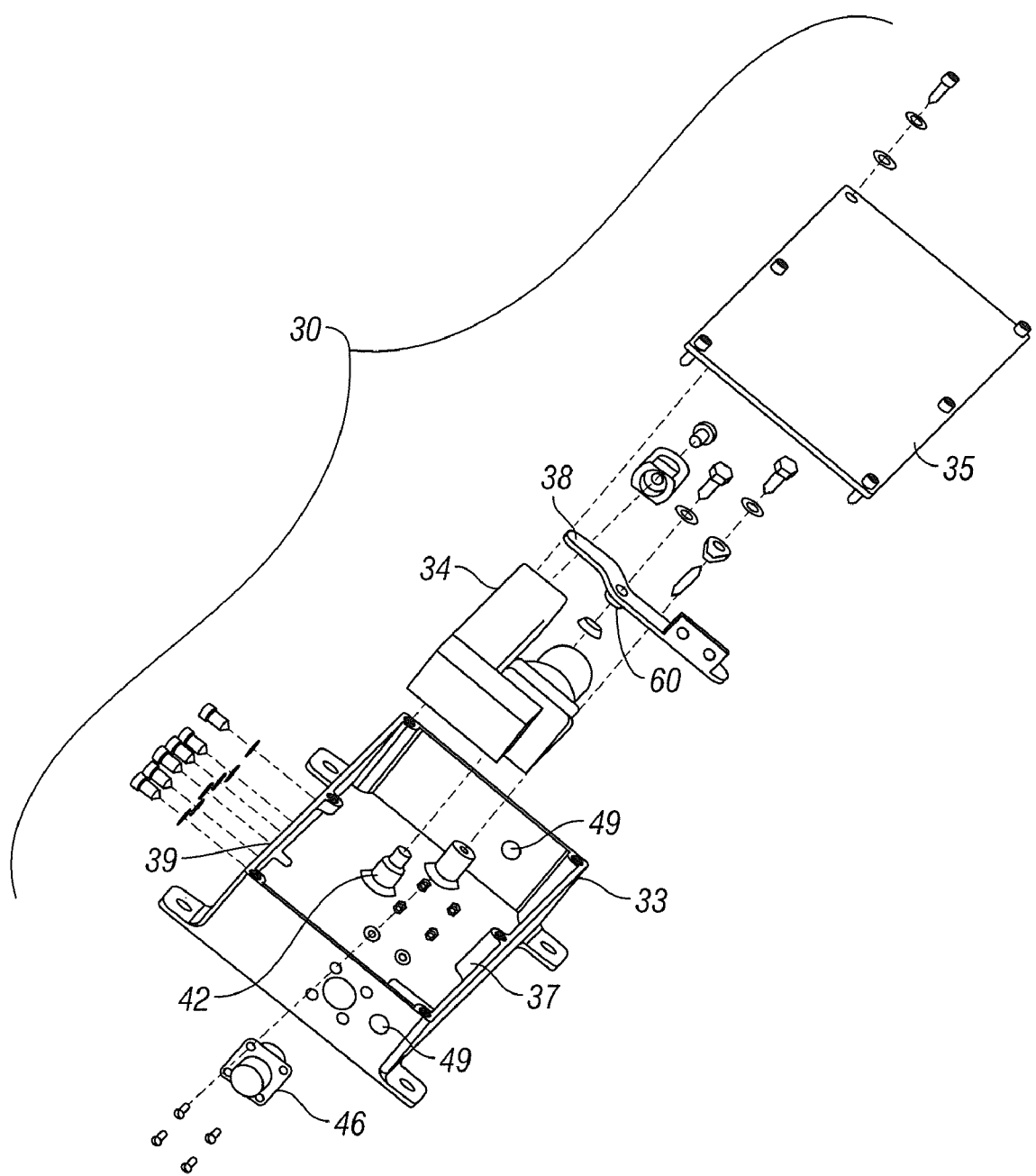
FIG. 3 is another isometric exploded view of the actuator box assembly.

Referring to FIGS. 2-4, an embodiment of actuator box assembly 30 according to the present invention will be described. Actuator box assembly 30 generally includes a housing assembly, mechanical input actuator 32, electromechanical input actuator 34 and a mechanical output actuator 36, which are coupled together through a pivot member 38. The three actuators are coupled to each other within actuator box assembly 30 so that operation of either input actuator 32, 34 is sufficient to activate output actuator 36 and so that each input actuator is free to activate output actuator 36 without being hindered by the other input actuator.

The housing assembly includes a housing body 33, a cover 35 and a cover seal 37, such as a gasket. EM actuator 34, pivot member 38 and portions of mechanical input actuator 32 and mechanical output actuator 36 are mounted within housing body 33 and cover 35 is mounted to housing body 33 to enclose the components. Cover seal 37 is placed between housing body 33 and cover 35 during assembly so that the housing assembly is substantially watertight.

Housing body 33 includes boss 42 that is configured so that pivot member 38 may be rotatably mounted within the housing assembly. Boss 42 is generally cylindrical and extends from an inside bottom surface of housing body 33. In addition, a plurality of actuator mounting features 39, such as apertures, or threaded holes, are included in housing so that electromechanical actuator 34 may be mounted inside housing body 33 with mechanical fasteners, such as screws.

A connector mount 44 is also included so that an electric connector 46, preferably a military standard waterproof connector, may be mounted to housing body 33 to provide an electric connection between portions of communication line 23 inside and outside of the housing assembly allowing actuator box assembly 30 to be easily removed from floatation system 10. The housing assembly also includes through holes 49 so that portions of mechanical input actuator 32 and mechanical output actuator 36 may pass through the wall of housing body 33. Preferably, seals are provided at each of through holes 49 so that the mechanical actuators may pass through housing body 33 without affecting the water resistance of the housing assembly. Housing body 33 also includes mounting pads 50 that allow actuator box assembly 30 to be fastened to the vessel.

Housing body 33 and cover 35 may be constructed from any material sufficient to protect the actuators and pivot member 38 from damage caused by ingress of liquid or mechanical shock. For example, suitable materials include plastics such as polycarbonate, composite materials such as carbon fiber, and metals such as aluminum, titanium and steel. Housing body 33 and cover 35 may be molded, machined or die cast.

Pivot member 38 is an elongate lever arm that includes a pivot collar 60 that is configured to be mounted on boss 42. Pivot collar 60 is configured to receive a reduced diameter mounting portion 63 of boss 42. A threaded bore 61 extends into boss 42 so that a fastener is inserted into boss 42 through pivot member 38 to retain pivot member 38 on boss 42. It should be appreciated that any type of fastener may be used, such as screws, clips, cotter pins, etc. Furthermore, it should be appreciated that although the fastener preferably is removable, a permanent fastener may be employed if desired.

In the present embodiment, pivot member 38 is generally Z-shaped and includes a first portion 65 configured to interface EM input actuator 34 and a second portion 66 configured to interface mechanical input actuator 32. Pivot collar 60 is located between first and second portions 65, 66 of pivot member 38. When pivot member 38 is mounted in housing body 33 pulling on one portion of pivot member 38 causes rotation of pivot member 38 in the same direction as pushing on the other portion. It should be appreciated that easy rotation of pivot member 38 relative to boss 42 may be assured by bearings, bushings or any lubrication desired.

Figure 7:
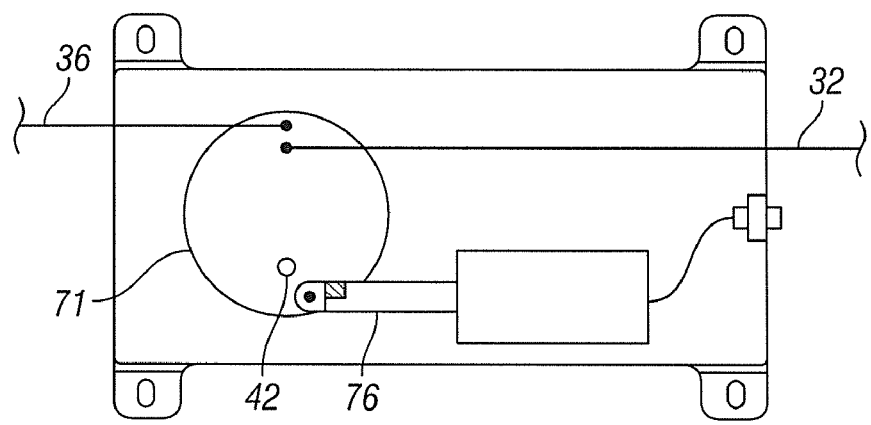
FIG. 7 is a top view of an alternative embodiment of the assembled actuator box assembly with the lid removed to show the contents as they are assembled in a manually deployed state.

It should also be appreciated that the pivot member may be any shape and may include arcuate camming surfaces. For example, as shown in FIG. 7 the pivot member may be a disk 71 that is mounted at its center (not shown), or mounted eccentrically (shown), to boss 42. As a further example, pivot member may be triangular or any other polygonal shape rotatably coupled to boss 42. As a still further alternative, the pivot member may be a cart that translates linearly on guides or tracks. In addition, pivot member 38 may be dimensioned so that a mechanical advantage is provided to any particular actuator. For example, as shown, mechanical input actuator 32 is coupled to pivot member or disk 71 further radially outward than output actuator 36, which results in greater force applied to output actuator 36 than is input to input actuator 32.

Referring again to FIGS. 2-4, a biasing assembly 67 is also included in actuator box assembly 30 that biases the rotation of pivot member 38 away from the direction of rotation used to deploy floatation system 10. Biasing assembly 67 includes a spring 68 that extends between a boss 69 of housing body 33 and pivot member 38. The spring rate of spring 68 is selected so that during operation the force exerted by input actuators 32, 34 on pivot member 38 can overcome the counteracting force exerted by biasing assembly 67 on pivot member 38. Biasing assembly 67 may be any device capable of biasing the rotation of pivot member 38. In the present embodiment, spring 68 of biasing assembly 67 is a helical spring, but it should be appreciated that spring 68 may be any spring device such as a torsional spring.

EM input actuator 34 is a linear actuator that includes an electric motor 70, an optional gear box 72 and a linear drive 74 that includes an extendable actuator arm 76. A pivot member connector 78 of actuator arm 76 is configured to be engageable with pivot member, i.e., by abutting pivot member 38 so that extension of actuator arm 76 causes pivot member 38 to rotate. Pivot member connector 78 also includes guide arms 80 that prevent disengagement between pivot member 38 and connector 78 when actuator arm 76 is extended but allow disengagement when pivot member 38 is rotated by mechanical trigger system 28, as described in greater detail below. It should be appreciated that EM input actuator 34 may be custom made or any of a number of commercially available actuators sufficient to rotate pivot member 38 as required.

Figure 8:
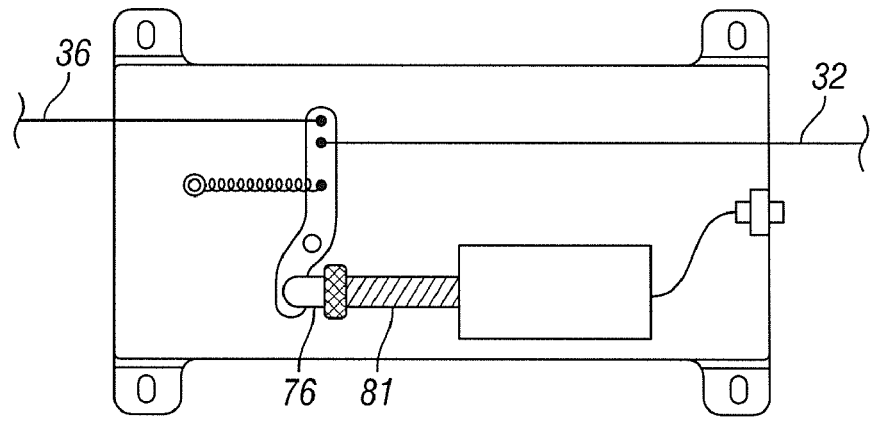
FIG. 8 is a top view of an alternative embodiment of the assembled actuator box assembly with the lid removed to show the contents as they are assembled in a manually deployed state.
Figure 9:
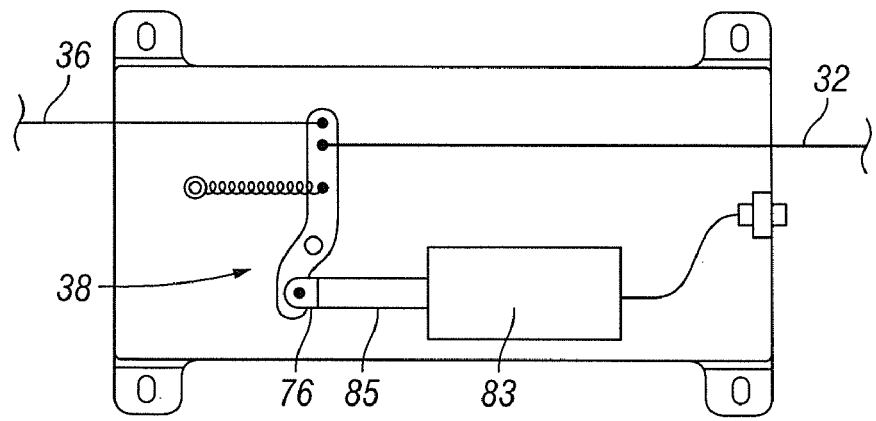
FIG. 9 is a top view of an alternative embodiment of the assembled actuator box assembly with the lid removed to show the contents as they are assembled in a manually deployed state.

Linear drive 74 converts the rotational movement provided by electric motor 70 and gear box 72 into linear motion of actuator arm 76. Linear drive 74 may be any type of linear drive known in the art such as a lead screw, a ball screw, an acme screw or a rack and pinion. An embodiment of the present invention including a lead screw 81 is shown in FIG. 8. It should also be appreciated that the linear actuator may be any type of linear actuator and need not include a rotating electric motor. For example, as shown is FIG. 9, the EM input actuator may be a solenoid 83 including an armature 85 similarly coupled to pivot member 38. It should further be appreciated that the linear actuator may be replaced by any electromechanical actuator that is configured to rotate pivot member 38. For example, any type of electric motor, such as a stepper motor or constant reluctance motor, may be coupled directly, or through a gear drive, to pivot member 38 without utilizing linear drive 74.

Mechanical input actuator 32 is a pull cable. A first end of actuator 32 is coupled to the mechanical trigger (i.e., the handle) of mechanical trigger system 28 that is mounted in the vessel so that it is accessible to the operator. A second end of actuator 32 is coupled to pivot member 38 inside actuator box assembly 30 so that pulling the handle rotates pivot member 38. The pull cable is preferably housed in a cable housing that protects the cable from damage. In addition, the cable housing preferably includes a friction reducing lining so that the pull cable may freely slide within the cable housing.

Mechanical output actuator 36 is also a pull cable in the present embodiment. A first end of output actuator 36 is coupled to pivot member 38 so that rotation of pivot member 38 by either input actuator 32, 34 pulls output actuator 36. A second end of output actuator 36 is coupled to valve 20 so that pulling output actuator 36 causes valve 20 to open so that floatation system 10 is deployed.

Figure 5:
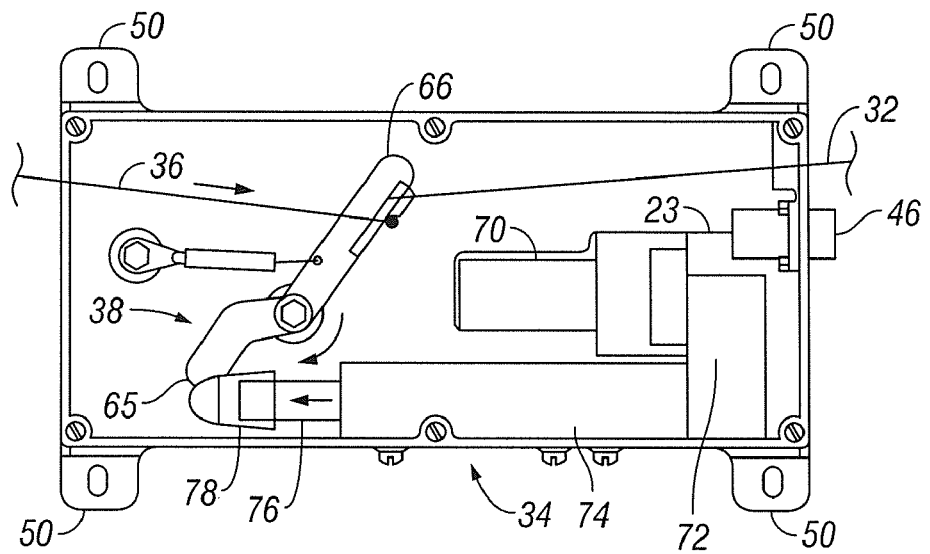
FIG. 5 is a top view of the assembled actuator box assembly with the lid removed to show the contents as they are assembled in a deployed state.
Figure 6:
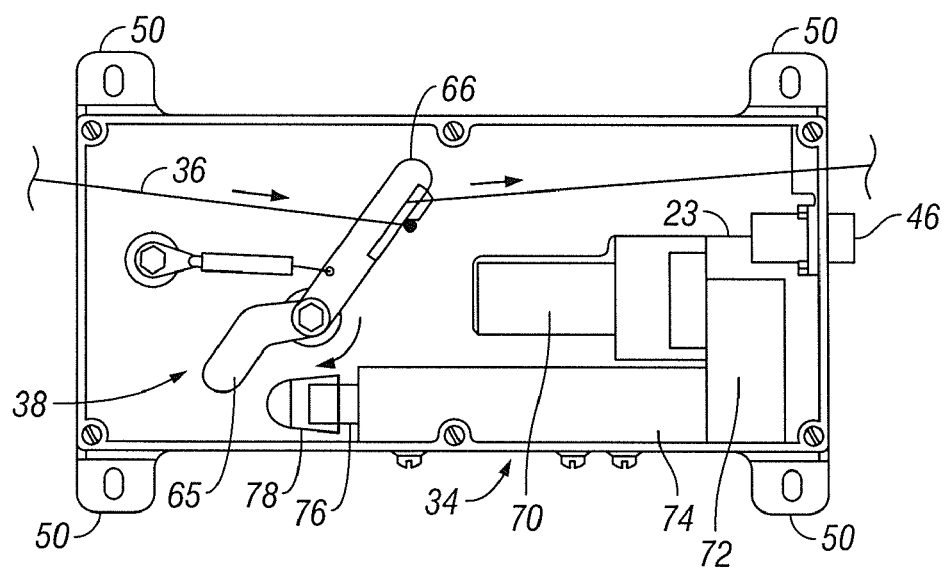
FIG. 6 is a top view of the assembled actuator box assembly with the lid removed to show the contents as they are assembled in a manually deployed state.

Referring to FIGS. 4-6, operation of actuator box assembly 30 will be described. During normal operation of the vessel, inflation device 14 of floatation system 10 remains stowed and actuator box assembly is in a non-deployed state, as shown in FIG. 4. In the non-deployed state, actuator arm 76 is in a retracted position and pivot member 38 abuts connector 78 under the influence of biasing assembly 67. The abutment between pivot member 38 and connector 78 limits the rotation of pivot member 38 in the counter-clockwise direction. The force applied by biasing assembly 67 assures that pivot member 38 remains in contact with connector 78 and that pivot member 38 will not rotate under the influence of small movements of mechanical input actuator 32 or mechanical shocks exerted on actuator box assembly 30.

In an emergency, floatation system 10 is preferably electrically activated by EM trigger system 28. An operator utilizes EM trigger system 28 by activating switch 22, which causes an electrical signal to travel through communication line 23 to EM input actuator 34. The electrical signal causes EM input actuator 34 to extend actuator arm 76 which forces pivot member 38 to rotate in the clockwise direction as shown in FIG. 5. In particular, extension of actuator arm 76 and engagement of connector 78 with pivot member 38 causes forcible abutment between connector 78 and pivot member 38, thereby causing pivot member 38 to rotate. Clockwise rotation of pivot member 38 causes pivot member 38 to pull output actuator 36, which activates valve 20 to deploy floatation system 10.

In the event that the electrical triggering of valve 20 is not successful, for example during a complete electrical failure, mechanical trigger system 28 may be used to deploy floatation system 10. The operator may utilize mechanical trigger system 28 by pulling the pull cable (i.e., mechanical input actuator 32) by grasping and pulling the handle. Pulling the pull cable causes pivot member 38 to rotate in the clockwise direction, as shown in FIG. 6. Rotation of pivot member 38 causes output actuator 36 to be pulled which causes valve 20 to switch to an open position. Once open, valve 20 allows pressurized fluid to flow from the inflation reservoir and into emergency inflatable device 14.

Each input actuator 32, 34 is free to operate without being hindered by the other. When EM trigger system 27 is utilized, it causes pivot member 38 to rotate clockwise which makes the pull cable of mechanical input actuator 32 less taut. On the other hand, when mechanical trigger system 28 is utilized, pivot member 38 rotates and because EM input actuator 34 is engageable but not fixedly coupled with pivot member 38, pivot member 38 is free to rotate away from connector 78 without hindrance.

While actuator box assembly 30 is described in the context of a trigger for an emergency floatation system, those skilled in the art will appreciate that many additional uses for actuator box assembly 30 are readily identifiable. Actuator box assembly 30 could be used in any electromechanical trigger system where a fully manual backup system is advantageous.

What is claimed is:

1. An actuator box comprising:
   a housing;
   a pivot arm connected to said housing;
   an electromechanical linear actuator connected to said housing and said pivot arm;
   a pull cable connected to said pivot arm;
   an actuator cable connected to said pivot arm, wherein actuation of said pull cable or said electromechanical linear actuator causes rotation of said pivot arm which causes actuation of said actuator cable.

2. The actuator box of claim 1, further comprising a biasing assembly configured to bias the rotation of the pivot arm in a direction of rotation opposite of the direction of rotation of the pivot arm caused by the pull cable or electromechanical linear actuator.

3. An actuator box of an emergency floatation system, comprising:
   a housing;
   a pivot member pivotally coupled to the housing and disposed in the housing;
   a mechanical input actuator directly connected to the pivot member and configured to rotate the pivot member in a first direction;
   an electromechanical linear input actuator disposed in the housing and configured to rotate the pivot member in the first direction; and
   a mechanical output actuator coupled to the pivot member and configured to be actuated when the pivot member is rotated in the first direction.

4. The actuator box of claim 3, wherein the pivot member is a lever arm.

5. The actuator box of claim 3, wherein the pivot member is a disk pivotally coupled to the housing eccentrically and the input mechanical actuator is a pull cable connected to the disk.

6. The actuator box of claim 3, wherein the electromechanical linear input actuator includes an electric motor.

7. The actuator box of claim 6, wherein the electric motor is coupled to a linear drive that is coupled to the pivot member.

8. The actuator box of claim 7, wherein the linear drive is a lead screw.

9. The actuator box of claim 6, wherein the electromechanical actuator comprises a linear actuator.

10. The actuator box of claim 9, wherein the linear actuator comprises a solenoid.

11. The actuator box of claim 3, wherein the mechanical input actuator comprises a pull cable.

12. The actuator box of claim 3, wherein the mechanical output actuator comprises a pull cable.

13. The actuator box of claim 3, further comprising a biasing assembly that is coupled to the pivot member and is configured to rotate the pivot member in a second direction.

14. An emergency floatation system, comprising:
    an emergency inflatable device;
    a source of pressurized gas fluidly coupled to the emergency inflatable device through a valve;
    a mechanical trigger;
    an electronic trigger; and
    an actuator box assembly including a housing and a pivot member coupled to the housing, a mechanical linear input actuator coupled to the mechanical trigger, an electromechanical linear input actuator coupled to the electronic trigger and a mechanical output actuator coupled to the valve,
    wherein the mechanical linear input actuator and mechanical output actuator are coupled to the pivot member and the electromechanical linear input actuator is engageable with the pivot member such that operation of either input actuator rotates the pivot member and operates the output actuator which operates the valve, and
    wherein the actuator box assembly is spaced from the valve.

15. The emergency floatation system of claim 14, wherein the pivot member is a lever arm.

16. The emergency floatation system of claim 14, wherein the pivot member comprises an eccentric disk pivotally coupled to the housing eccentrically and the mechanical linear input actuator comprises a pull cable connected to the disk.

17. The emergency floatation system of claim 14, wherein the mechanical linear input actuator comprises a pull cable.

18. The emergency floatation system of claim 14, wherein the mechanical output actuator comprises a pull cable.

* * * * *